United States Patent
Yang

(10) Patent No.: US 11,320,689 B1
(45) Date of Patent: May 3, 2022

(54) DISPLAY DEVICE

(71) Applicant: WUHAN CHINA STAR OPTOELECTRONICS TECHNOLOGY CO., LTD, Wuhan (CN)

(72) Inventor: Yong Yang, Wuhan (CN)

( * ) Notice: Subject to any disclaimer, the term of this patent is extended or adjusted under 35 U.S.C. 154(b) by 208 days.

(21) Appl. No.: 16/955,095

(22) PCT Filed: Apr. 3, 2020

(86) PCT No.: PCT/CN2020/083199
§ 371 (c)(1),
(2) Date: Jun. 18, 2020

(87) PCT Pub. No.: WO2021/184434
PCT Pub. Date: Sep. 23, 2021

(30) Foreign Application Priority Data

Mar. 18, 2020 (CN) .......................... 202010190025.8

(51) Int. Cl.
G02F 1/1335 (2006.01)
G06V 40/13 (2022.01)
G02F 1/13357 (2006.01)
G02F 1/1333 (2006.01)

(52) U.S. Cl.
CPC .... *G02F 1/133514* (2013.01); *G02F 1/13338* (2013.01); *G02F 1/133531* (2021.01); *G02F 1/133603* (2013.01); *G06V 40/1318* (2022.01)

(58) Field of Classification Search
CPC ........... G02F 1/13338; G02F 1/133531; G02F 1/133603; G06V 40/1318
See application file for complete search history.

(56) References Cited

U.S. PATENT DOCUMENTS

| | | | |
|---|---|---|---|
| 2015/0187980 A1* | 7/2015 | Yamamoto | H01L 31/125 250/552 |
| 2019/0286873 A1* | 9/2019 | Liu | H04N 5/2251 |
| 2020/0236259 A1* | 7/2020 | Nakamura | G02F 1/133512 |
| 2020/0409218 A1* | 12/2020 | Tsai | G06V 40/1324 |

FOREIGN PATENT DOCUMENTS

| | | |
|---|---|---|
| CN | 108153053 A | 6/2018 |
| CN | 108171178 A | 6/2018 |
| CN | 108986678 A | 12/2018 |
| CN | 109164648 A | 1/2019 |
| CN | 109445171 A | 3/2019 |
| CN | 109445182 A | 3/2019 |
| CN | 110133788 A | 8/2019 |
| CN | 110231735 A | 9/2019 |
| CN | 110275340 A | 9/2019 |
| CN | 110632789 A | 12/2019 |
| CN | 110658886 A | 1/2020 |
| CN | 110850626 A | 2/2020 |
| JP | 4765473 B2 | 9/2011 |

* cited by examiner

*Primary Examiner* — James A Dudek

(57) ABSTRACT

The present disclosure provides a display device, which is divided into a camera placement area and a non-camera placement area, including a backlight module, a display module, and a camera. The display module includes an array substrate and a color filter substrate opposite to the array substrate. The array substrate and the color filter substrate together form a cell. Wherein, the display module provides fingerprint sensors corresponding to the camera placement area of the display device.

19 Claims, 3 Drawing Sheets

DISPLAY DEVICE

FIELD OF INVENTION

The present disclosure relates to the field of display technologies, and particularly relates to a display device.

BACKGROUND OF INVENTION

Under-screen optical fingerprint identification technology is a hot-spot in present market. OLED displays have inherent advantages in the under-screen optical fingerprint identification technology due to their self-emission characteristics. Due to low transmittance and complicated stacking structure of LCD displays and dimming effect of liquid crystal light valves, it is difficult to design optical paths of optical fingerprint and arrange sensors in a display area.

In present full-screen technology, due to presence of a camera, a full-screen display including a camera area cannot be achieved. At a same time, for under-screen optical fingerprint identification technology of LCDs, due to complexity of LCD display structures, there are many design difficulties. Therefore, it is necessary to improve this defect.

Technical Problems

The present disclosure provides a display device to solve technical problems that: in the display device of the prior art, the camera area cannot display, and due to low transmittance of the liquid crystal screen, it is difficult to design optical paths of optical fingerprint and arrange sensors in the display area.

Technical Solutions

The present disclosure provides a display device, which is divided into a camera placement area and a non-camera placement area, including a backlight module, a display module, and a camera. A first through hole is defined in the backlight module, and a maximum cross section of the first through hole corresponds to the camera placement area of the display device. The display module is disposed on the backlight module and includes an array substrate, a color filter substrate opposite to the array substrate to form a cell together with the array substrate, a liquid crystal layer disposed between the array substrate and the color filter substrate and corresponding to the non-camera placement area of the display device, a lower polarizer disposed on a side of the array substrate adjacent to the backlight module and corresponding to the non-camera placement area of the display device, a built-in upper polarizer disposed on a side of the color filter substrate adjacent to the liquid crystal layer and corresponding to the non-camera placement area of the display device, and a micro-light emitting diode (LED) module disposed on a side of the color filter substrate facing away from the array substrate and corresponding to the camera placement area of the display device. The camera is disposed on a side of the backlight module facing away from the display module and corresponding to the camera placement area of the display device. Wherein the display module includes fingerprint sensors corresponding to the camera placement area of the display device, projections of sensor units of the fingerprint sensors on the color filter substrate do not have any overlaps with micro-LED units of the micro-LED module.

In the display device provided by an embodiment of the present disclosure, the fingerprint sensors are disposed on a side of the array substrate facing the color filter substrate.

In the display device provided by an embodiment of the present disclosure, a number of the fingerprint sensors ranges from 15 to 35.

In the display device provided by an embodiment of the present disclosure, the micro-LED units include red micro-LED units, green micro-LED units, and blue micro-LED units; the micro-LED units are arranged in a matrix; any row of the matrix is cyclically arranged in an order of the red micro-LED unit, the green micro-LED unit, and the blue micro-LED unit; and colors of the micro-LED units in any column are the same.

In the display device provided by an embodiment of the present disclosure, each of the sensor units of the fingerprint sensors is disposed between two of the micro-LED units in a row.

In the display device provided by an embodiment of the present disclosure, an entire width of the micro-LED module is greater than an aperture of the first through hole.

In the display device provided by an embodiment of the present disclosure, the aperture of the first through hole ranges from 2 mm to 3 mm.

In the display device provided by an embodiment of the present disclosure, a width of any one of the micro-LED units ranges from 10 um to 50 um.

In the display device provided by an embodiment of the present disclosure, the backlight module includes a light source and an optical film unit, the light source is disposed on a side of the optical film unit.

In the display device provided by an embodiment of the present disclosure, a light blocking layer is provided inside the first through hole.

In the display device provided by an embodiment of the present disclosure, the fingerprint sensors are disposed on a side of the color filter substrate facing the array substrate.

In the display device provided by an embodiment of the present disclosure, a number of the fingerprint sensors ranges from 15 to 35.

In the display device provided by an embodiment of the present disclosure, the micro-LED units include red micro-LED units, green micro-LED units, and blue micro-LED units; the micro-LED units are arranged in a matrix; any row of the matrix is cyclically arranged in an order of the red micro-LED unit, the green micro-LED unit, and the blue micro-LED unit; and colors of the micro-LED units in any column are the same.

In the display device provided by an embodiment of the present disclosure, the sensor unit of the fingerprint sensor is disposed between two of the micro-LED units in a row.

In the display device provided by an embodiment of the present disclosure, an entire width of the micro-LED module is greater than an aperture of the first through hole.

In the display device provided by an embodiment of the present disclosure, the aperture of the first through hole ranges from 2 mm to 3 mm.

In the display device provided by an embodiment of the present disclosure, a width of any one of the micro-LED units ranges from 10 um to 50 um.

In the display device provided by an embodiment of the present disclosure, the backlight module includes a light source and an optical film unit, the light source is disposed on a side of the optical film unit.

In the display device provided by an embodiment of the present disclosure, a light blocking layer is provided inside the first through hole.

Beneficial Effects

In the present disclosure, a micro-LED module and fingerprint sensors are provided in the camera placement area, and the micro-LED units in the micro-LED module and the sensor units of the fingerprint sensors do not overlap in a vertical direction, thereby achieving full-screen display function, under-screen optical fingerprint unlocking function, and camera function.

DETAILED DESCRIPTION OF EMBODIMENTS

In order to make objectives, technical solutions, and effects of the present disclosure clearer and clearer, the present disclosure will be described in further detail below with reference to the accompanying drawings and examples. It should be understood that specific embodiments described herein are only used to explain the present disclosure, and are not used to limit the present disclosure.

Figure 1:
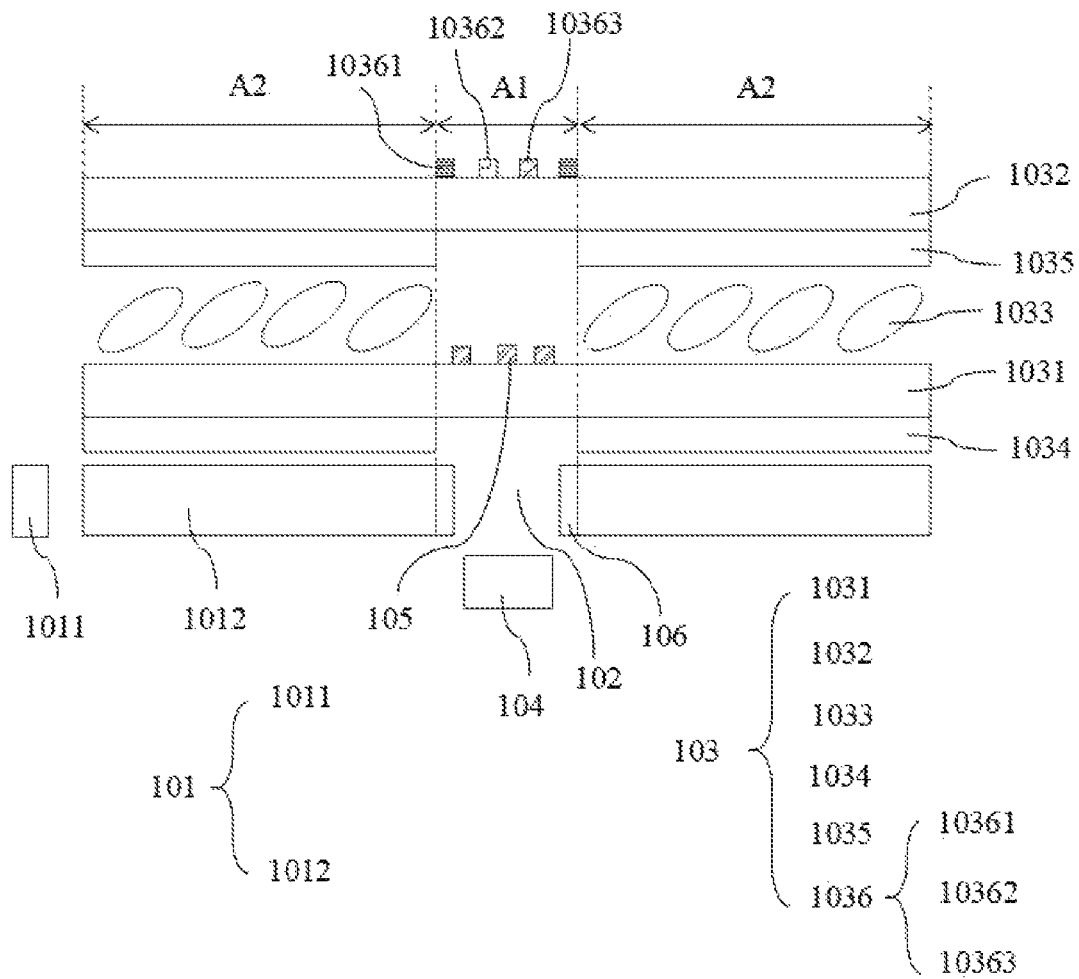
FIG. 1 is a schematic view of a display device according to an embodiment of the present disclosure.

Referring to FIG. 1, it is a schematic view of a display device according to an embodiment of the present disclosure. In the figure, components of this application and relative positional relationships between the components are intuitive. The display device is divided into a camera placement area A1 and a non-camera placement area A2. The display device includes a backlight module 101, a display module 103, and a camera 104.

A first through hole 102 is defined in the backlight module 101, and a maximum cross section of the first through hole 102 corresponds to the camera placement area A1 of the display device.

The display module 103 is disposed on the backlight module 101. The display device includes an array substrate 1031, a color filter substrate 1032 opposite to the array substrate 1031 to form a cell together with the array substrate 1031, a liquid crystal layer 1033 disposed between the array substrate 1031 and the color filter substrate 1032 and corresponding to the non-camera placement area A2 of the display device, a lower polarizer 1034 disposed on a side of the array substrate 1031 adjacent to the backlight module 101 and corresponding to the non-camera placement area A2 of the display device, a built-in upper polarizer 1035 disposed on a side of the color filter substrate 1032 adjacent to the liquid crystal layer 1033 and corresponding to the non-camera placement area A2 of the display device, and a micro-light emitting diode (LED) module 1036 disposed on a side of the color filter substrate 1032 facing away from the array substrate 1031 and corresponding to the camera placement area A1 of the display device.

The camera 104 is disposed on a side of the backlight module 101 facing away from the display module 103 and corresponding to the camera placement area A1 of the display device.

Wherein, the display module 103 includes fingerprint sensors 105 corresponding to the camera placement area A1 of the display device, and projections of sensor units of the fingerprint sensors 105 on the color filter substrate 1032 do not have any overlaps with micro-LED units of the micro-LED module 1036.

It should be noted that in embodiments of the present disclosure, a secondary screen display area having the same resolution is provided in the camera placement area of the display device, and an optical fingerprint unlocking architecture is provided on the display module below the secondary screen display area. Since a structure of the secondary screen display area is relatively simple and benefits to a design of the fingerprint sensor, it can improve accuracy of unlocking and will not affect function of the main screen display area.

It should be noted that, the camera 104 is below the display module 103. When the camera 104 is not working, the micro-LED module 1036 can display normally while hiding the camera 104. When the camera 104 is working, the micro-LED module 1036 can be turned off, and at the same time, if an ambient light is insufficient, the micro-LED module 1036 can be used as an exposure lamp.

It should be noted that each micro-LED unit in the micro-LED module 1036 is directly used as a display, a dimension of the micro-LED unit can reach a level of a dimension of pixels, and each LED is individually controlled by a TFT circuit. The TFT circuit (not shown in the figure) is disposed below the micro-LED module 1036. Micro-LED units in the micro-LED module 1036 are prepared above the TFT circuits through processes such as mass transfer, binding, detection and repair, and so on. Wherein, the micro-LED module 1036 is a transparent display, that is, the camera placement area A1 of the display device can realize display and photographing functions.

It should be noted that the color filter substrate 1032 corresponds to a structure of the built-in upper polarizer and the camera placement area A1 of the display device with no photoresist, so as to ensure that the camera 104 has a large amount of light entering when taking pictures.

It should be noted that the built-in upper polarizer 1035 is made of aluminum, silver, etc. and fabricated on an inner side of the color filter substrate 1032 by a metal wire grid nanoimprint method.

In an embodiment, the fingerprint sensors 105 are disposed on a side of the array substrate 1031 facing the color filter substrate 1032.

In an embodiment, a number of the fingerprint sensors 105 ranges from 15 to 35.

In an embodiment, the micro-LED units include red micro-LED units 10361, green micro-LED units 10362, and blue micro-LED units 10363.

In an embodiment, the micro-LED units are arranged in a matrix. Any row of the matrix is cyclically arranged in an order of the red micro-LED unit 10361, the green micro-LED unit 10362, and the blue micro-LED unit 10363. Colors of the micro-LED units in any column are the same.

In an embodiment, the sensor unit of the fingerprint sensor 105 is disposed between two of the micro-LED units in a row.

In an embodiment, an entire width of the micro-LED module 1036 is greater than an aperture of the first through hole 102, so as to hide a sealant (not shown in the figure) of the liquid crystal layer 1033 and a glue iron frame (not shown in the figure) in the backlight module 101, thereby preventing the display from being affected or showing black borders.

In an embodiment, a dimension of the sensor unit of the fingerprint sensor 105 is comparable to a dimension of the micro-LED unit. The micro-LED unit above the fingerprint sensor 105 can block reflected light at an angle greater than 20 degrees, so as to prevent the reflected light from being received by the sensor unit of the fingerprint sensor 105 below the micro-LED unit, ensure the sensor unit can receive a difference signal of "ridge" and "valley" in a fingerprint, and identify the fingerprint to unlock.

It should be noted that in the description of blocking reflected light at an angle greater than 20 degrees, 20 degrees is a value that needs to be reached, because the sensor unit of the fingerprint sensor 105 needs to receive collimated light or nearly collimated light.

In an embodiment, the aperture of the first through hole 102 ranges from 2 mm to 3 mm.

In an embodiment, a width of any one of the micro-LED units ranges from 10 um to 50 um.

In an embodiment, the backlight module 101 includes a light source 1011 and an optical film unit 1012, the light source 1011 is disposed on a side of the optical film unit 1012. That is, the backlight module 101 is a side-in backlight, and the backlight module 101 performs a digging process in the camera placement area A1 of the display device, and there are no liquid crystals at an aperture of the dug hole, which is filled by a transparent medium having a same refractive index as glass. The camera 104 is specifically disposed at an edge of a light exit side of the optical film unit 1012.

In an embodiment, a light blocking layer 106 is provided inside the first through hole 102. The structural light blocking layers 106 on both sides are configured to separate a backlight of a main screen display area and a display of a micro-LED display area.

Figure 2:
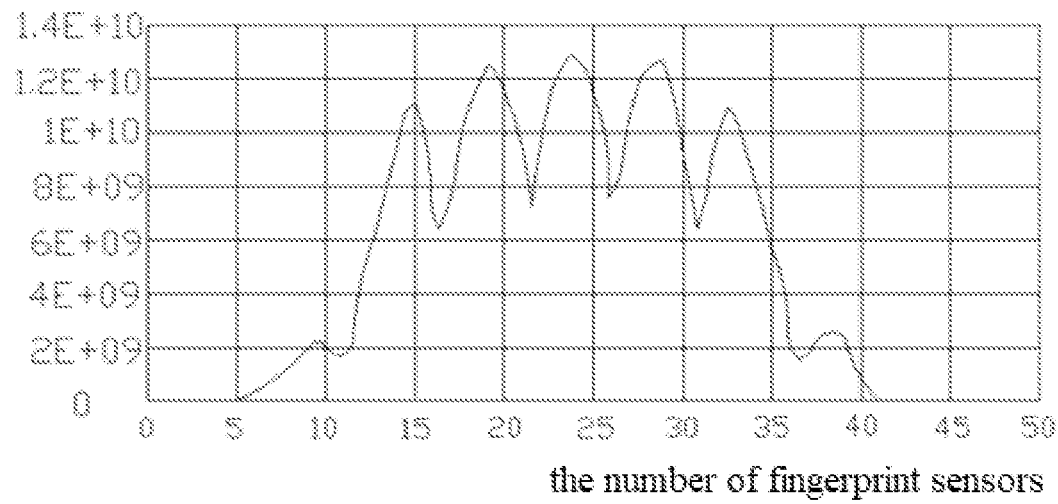
FIG. 2 is a graph showing a relationship between number of fingerprint sensors and reflected light intensity of the display device according to an embodiment of the present disclosure.

As shown in FIG. 2, it is a graph showing a relationship between the number of fingerprint sensors and a reflected light intensity of the display device according to an embodiment of the present disclosure. It can be seen that when the number of fingerprint sensors is 15 to 35, a contrast between the valley and the ridge is relatively large, which is beneficial for realizing quick unlocking of the fingerprint. In the figure, the abscissa shows the number of sensors, the ordinate shows the reflected light intensity, the curve is a simulation curve, and the light is a collimated light.

Figure 3:
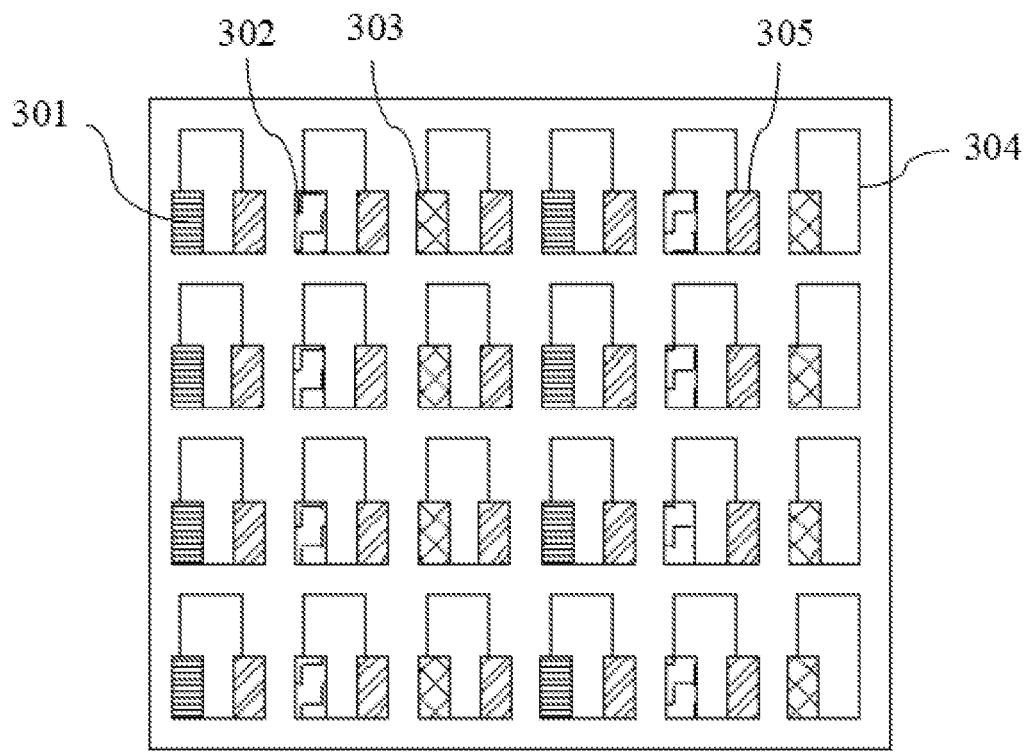
FIG. 3 is a schematic diagram showing arrangements of micro-LED units and sensor units of the fingerprint sensors, which correspond to a camera placement area, of a display module according to an embodiment of the present disclosure.

As shown in FIG. 3, it is a schematic diagram showing arrangements of the micro-LED units and the sensor units of the fingerprint sensors, which correspond to the camera placement area, of the display module according to an embodiment of the present disclosure. The micro-LED units include red micro-LED units 301, green micro-LED units 302, and blue micro-LED units 303. Wherein, the micro-LED units are arranged in a matrix. Any row of the matrix is cyclically arranged in an order of the red micro-LED unit 301, the green micro-LED unit 302, and the blue micro-LED unit 303. Colors of the micro-LED units in any column are the same. The sensor unit 305 of the fingerprint sensor 304 is disposed between two of the micro-LED units in a row. The sensor unit 305 of the fingerprint sensor 304 includes, for example, a plurality of CMOS optical devices or a plurality of CCD optical devices.

It should be noted that a chip of each micro-LED unit is fixed on an out-side of the color filter substrate (not shown in the figure) through a binding process, and an array of the sensor units 305 of the fingerprint sensors 304 is located between the chips to ensure that a differential signal in the fingerprint can be received.

It should be noted that the arrangements of the micro-LED units and the sensor units of the fingerprint sensors provided by the embodiments of the present disclosure are not limited to these. In other embodiments, as long as the arrangements of the micro-LED unit and the sensor units of the sensors in a vertical direction do not overlap, all solutions fall within protection scope of the present disclosure.

Figure 4:
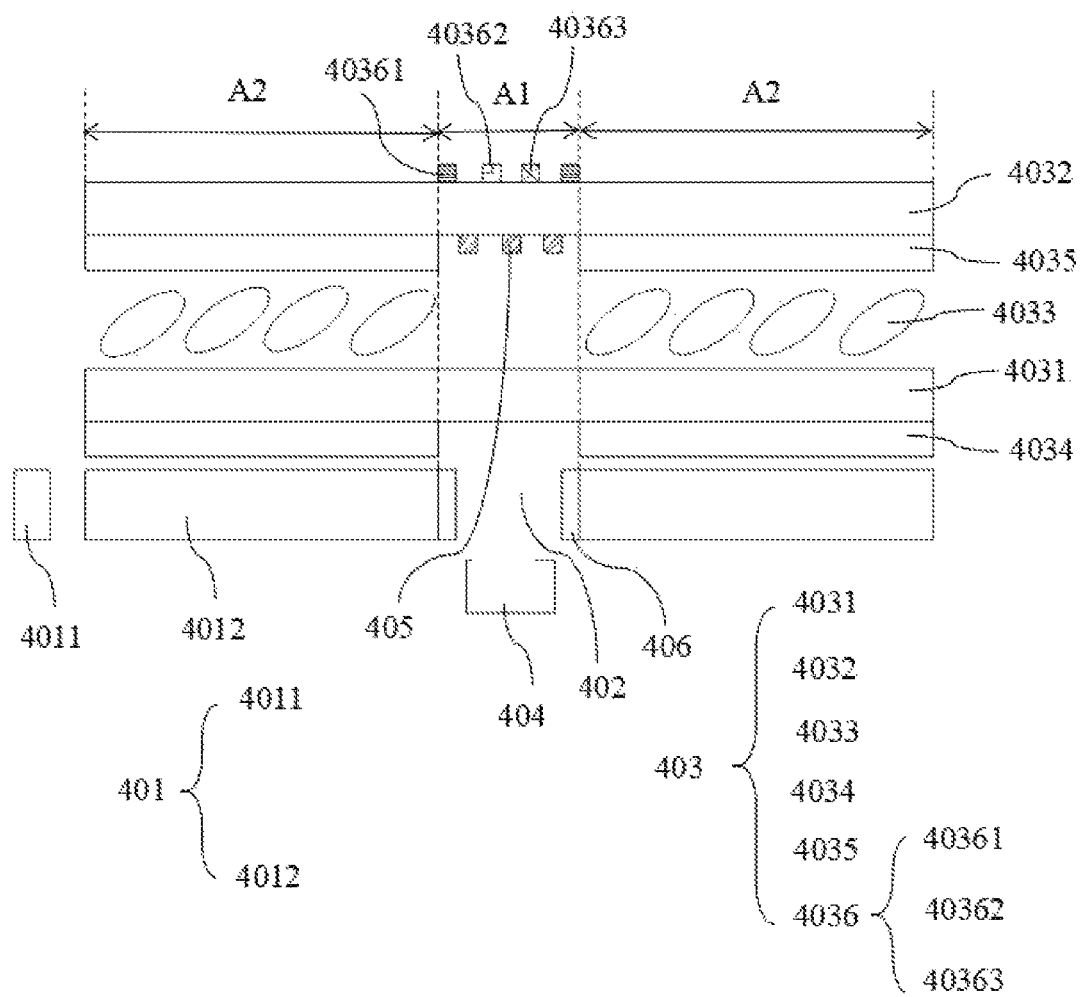
FIG. 4 is another schematic view of the display device according to an embodiment of the present disclosure.

As shown in FIG. 4, it is another schematic view of the display device according to an embodiment of the present disclosure. In the figure, components of this application and relative positional relationships between the components are intuitive. The display device is divided into a camera placement area A1 and a non-camera placement area A2. The display device includes a backlight module 401, a display module 403, and a camera 404.

A first through hole 402 is defined in the backlight module 401, and a maximum cross section of the first through hole 402 corresponds to the camera placement area A1 of the display device.

The display module 403 is disposed on the backlight module 401. The display device includes an array substrate 4031, a color filter substrate 4032 opposite to the array substrate 4031 to form a cell together with the array substrate 4031, a liquid crystal layer 4033 disposed between the array substrate 4031 and the color filter substrate 4032 and corresponding to the non-camera placement area A2 of the display device, a lower polarizer 4034 disposed on a side of the array substrate 4031 adjacent to the backlight module 401 and corresponding to the non-camera placement area A2 of the display device, a built-in upper polarizer 4035 disposed on a side of the color filter substrate 4032 adjacent to the liquid crystal layer 4033 and corresponding to the non-camera placement area A2 of the display device, and a micro-light emitting diode (LED) module 4036 disposed on a side of the color filter substrate 4032 facing away from the array substrate 4031 and corresponding to the camera placement area A1 of the display device.

The camera 404 is disposed on a side of the backlight module 401 facing away from the display module 403 and corresponding to the camera placement area A1 of the display device.

Wherein, the display module 403 includes fingerprint sensors 405 corresponding to the camera placement area A1 of the display device, and projections of sensor units of the fingerprint sensors 405 on the color filter substrate 4032 do not have any overlaps with micro-LED units of the micro-LED module 4036.

Wherein, the fingerprint sensors 405 are disposed on a side of the color filter substrate 4032 facing the array substrate 4031.

In an embodiment, a number of the fingerprint sensors 405 ranges from 15 to 35.

In an embodiment, the micro-LED units include red micro-LED units 40361, green micro-LED units 40362, and blue micro-LED units 40363.

In an embodiment, the micro-LED units are arranged in a matrix. Any row of the matrix is cyclically arranged in an order of the red micro-LED unit 40361, the green micro-LED unit 40362, and the blue micro-LED unit 40363. Colors of the micro-LED units in any column are the same.

In an embodiment, the sensor unit of the fingerprint sensor 405 is disposed between two of the micro-LED units in a row.

In an embodiment, an entire width of the micro-LED module 4036 is greater than an aperture of the first through hole 402, so as to hide a sealant (not shown in the figure) of the liquid crystal layer 4033 and a glue iron frame (not shown in the figure) in the backlight module 401, thereby preventing the display from being affected or showing black borders.

In an embodiment, the aperture of the first through hole 402 ranges from 2 mm to 3 mm.

In an embodiment, a width of any one of the micro-LED units ranges from 10 um to 50 um.

In an embodiment, the backlight module 401 includes a light source 4011 and an optical film unit 4012, the light source 4011 is disposed on a side of the optical film unit 4012. That is, the backlight module 401 is a side-in backlight, and the backlight module 401 performs a digging process in the camera placement area A1 of the display device, and there are no liquid crystals at an aperture of the dug hole, which is filled by transparent medium having a same refractive index as glass. The camera 404 is specifically disposed at an edge of a light exit side of the optical film unit 4012.

In an embodiment, a light blocking layer 406 is provided inside the first through hole 402. The structural light blocking layers 406 on both sides are configured to separate a backlight of a main screen display area and a display of a micro-LED display area.

The display device provided in the embodiments of the present disclosure may be any product or component having a display function, such as a mobile phone, a tablet computer, a television, a display, a notebook computer, a digital camera, a navigator, and the like.

In summary, in the display device provided by embodiments of the present disclosure, the micro-LED module and the fingerprint sensors are provided in the camera placement area, and the micro-LED units in the micro-LED module and the sensor units of the fingerprint sensors do not overlap in a vertical direction, thereby achieving full-screen display function, under-screen optical fingerprint unlocking function, and camera function, so as to solve technical problems that: in the display device of the prior art, the camera area cannot display, and due to low transmittance of the liquid crystal screen, it is difficult to design optical paths of optical fingerprint and arrange sensors in the display area.

It can be understood that, for those of ordinary skill in the art, equivalent replacements or changes can be made according to the technical solutions of the present disclosure and their inventive concepts, and all such changes or replacements shall fall within a protection scope of attached claims of the application.

What is claimed is:

1. A display device, divided into a camera placement area and a non-camera placement area, comprising:
   a backlight module, wherein a first through hole is defined in the backlight module, and a maximum cross section of the first through hole corresponds to the camera placement area of the display device;
   a display module disposed on the backlight module and comprising:
      an array substrate;
      a color filter substrate opposite to the array substrate, wherein the array substrate and the color filter substrate together form a cell;
      a liquid crystal layer disposed between the array substrate and the color filter substrate and corresponding to the non-camera placement area of the display device;
      a lower polarizer disposed on a side of the array substrate adjacent to the backlight module and corresponding to the non-camera placement area of the display device;
      a built-in upper polarizer disposed on a side of the color filter substrate adjacent to the liquid crystal layer and corresponding to the non-camera placement area of the display device; and
      a micro-light emitting diode (LED) module disposed on a side of the color filter substrate facing away from the array substrate and corresponding to the camera placement area of the display device; and
   a camera disposed on a side of the backlight module facing away from the display module and corresponding to the camera placement area of the display device;
   wherein the display module comprises fingerprint sensors corresponding to the camera placement area of the display device, and projections of sensor units of the fingerprint sensors on the color filter substrate do not have any overlaps with micro-LED units of the micro-LED module.

2. The display device in claim 1, wherein the fingerprint sensors are disposed on a side of the array substrate facing the color filter substrate.

3. The display device in claim 2, wherein a number of the fingerprint sensors ranges from 15 to 35.

4. The display device in claim 1, wherein the micro-LED units comprise red micro-LED units, green micro-LED units, and blue micro-LED units, the micro-LED units are arranged in a matrix, any row of the matrix is cyclically arranged in an order of the red micro-LED unit, the green micro-LED unit, and the blue micro-LED unit; and colors of the micro-LED units in any column are same.

5. The display device in claim 4, wherein each of the sensor units of the fingerprint sensors is disposed between two of the micro-LED units in a row.

6. The display device in claim 1, wherein an entire width of the micro-LED module is greater than an aperture of the first through hole.

7. The display device in claim 6, wherein the aperture of the first through hole ranges from 2 mm to 3 mm.

8. The display device in claim 6, wherein a width of any one of the micro-LED units ranges from 10 um to 50 um.

9. The display device in claim 1, wherein the backlight module comprises a light source and an optical film unit, and the light source is disposed on a side of the optical film unit.

10. The display device in claim 9, wherein a light blocking layer is provided inside the first through hole.

11. The display device in claim 1, wherein the fingerprint sensors are disposed on a side of the color filter substrate facing the array substrate.

12. The display device in claim 11, wherein a number of the fingerprint sensors ranges from 15 to 35.

13. The display device in claim 11, wherein the micro-LED units comprise red micro-LED units, green micro-LED units, and blue micro-LED units, the micro-LED units are arranged in a matrix, any row of the matrix is cyclically arranged in an order of the red micro-LED unit, the green micro-LED unit, and the blue micro-LED unit; and colors of the micro-LED units in any column are same.

14. The display device in claim 13, wherein each of the sensor units of the fingerprint sensors is disposed between two of the micro-LED units in a row.

15. The display device in claim 11, wherein an entire width of the micro-LED module is greater than an aperture of the first through hole.

16. The display device in claim 15, wherein the aperture of the first through hole ranges from 2 mm to 3 mm.

17. The display device in claim 15, wherein a width of any one of the micro-LED units ranges from 10 um to 50 um.

18. The display device in claim 11, wherein the backlight module comprises a light source and an optical film unit, and the light source is disposed on a side of the optical film unit.

19. The display device in claim 18, wherein a light blocking layer is provided inside the first through hole.

* * * * *